(12) United States Patent
Ostman

(10) Patent No.: US 6,328,156 B1
(45) Date of Patent: Dec. 11, 2001

(54) CONVEYOR BELT SIDE CURTAINS

(75) Inventor: Arthur C. Ostman, 5402 Ostman Rd., Mt. Iron, MN (US) 55768

(73) Assignees: Arthur C. Ostman, Mt. Iron; Nelson-Williams Linings, Inc., Virgina, both of MN (US)

( * ) Notice: Subject to any disclaimer, the term of this patent is extended or adjusted under 35 U.S.C. 154(b) by 0 days.

(21) Appl. No.: 09/455,387

(22) Filed: Dec. 6, 1999

(51) Int. Cl.[7] .................................................. B65G 15/00
(52) U.S. Cl. .......................................... 198/836.1; 198/525
(58) Field of Search ................................. 198/525, 836.1

(56) References Cited

U.S. PATENT DOCUMENTS

| | | |
|---|---|---|
| Re. 31,249 | 5/1983 | Stahura . |
| 2,665,795 | 1/1954 | Holwick . |
| 3,024,893 | 3/1962 | Lambert . |
| 3,344,909 | 10/1967 | Hansen et al. . |
| 3,499,523 | 3/1970 | Clegg . |
| 4,231,471 | 11/1980 | Gordon . |
| 4,236,628 | 12/1980 | Stahura . |
| 4,641,745 | 2/1987 | Skates . |
| 4,874,082 | 10/1989 | Swinderman . |
| 4,898,272 | 2/1990 | Swinderman et al. . |
| 5,048,669 | 9/1991 | Swinderman . |
| 5,129,508 | * 7/1992 | Shelstad ............... 198/860.3 |
| 5,154,280 | 10/1992 | Mott . |
| 5,303,813 | 4/1994 | de Rooy . |
| 5,816,388 | * 10/1998 | Bowman ............... 198/836.6 |
| 5,913,404 | * 6/1999 | Bowman ............... 198/836.1 |

FOREIGN PATENT DOCUMENTS

| | | |
|---|---|---|
| 0151277 A1 | 12/1984 | (EP) . |
| WO 91/09798 | 7/2001 | (WO) . |

* cited by examiner

*Primary Examiner*—Christopher P. Ellis
*Assistant Examiner*—Joe Dillon, Sr.
(74) *Attorney, Agent, or Firm*—Nikolai & Mersereau, P.A.

(57) ABSTRACT

A skirt board and mounting plate for sealing the side edges of a conveyor belt to prevent spillage of material being transported. The skirt board comprises an elastomeric sheet having regularly spaced parallel ribs integrally formed on one major surface thereof and adapted for insertion within regularly spaced parallel slots formed in a metal mounting plate that is adapted for attachment to a frame disposed above or along side the conveyor belt.

9 Claims, 4 Drawing Sheets

CONVEYOR BELT SIDE CURTAINS

BACKGROUND OF THE INVENTION

I. Field of the Invention

This invention relates generally to materials handling equipment, and more particularly to the design of side curtains for use with conveyor belts used for transporting bulk materials for inhibiting spillage of the granular material.

II. Discussion of the Prior Art

Rubberized fabric conveyor belts are commonly used for transporting bulk materials, such as sand, gravel, iron ore, taconite and similar materials. Likewise, conveyor belts are commonly used in the grain milling industry for transporting granular materials.

A problem often arises at a location along the conveyor belt where the bulk material of the type described is dispensed from a hopper or chute onto the conveyor belt because of a tendency for the bulk material to overflow the side edges of the conveyor belt. This is especially true if the flow rate from the hopper is not properly matched to the speed of the conveyor belt. To avoid the attendant mess and need for frequent cleanup, an economical means must be provided for inhibiting spillage of the bulk material off from the side edges of the conveyor belt onto which the bulk material is being deposited.

The prior art teaches a variety of conveyor belt side curtains, also commonly referred to as skirt boards, and in this regard, reference is made to the Stahura U.S. Pat. No. 4,236,628, which became Reissue U.S. Pat. Re. No. 31,249. It comprises a plurality of relatively narrow (6" wide) interlocking skirt board sections having dove-tail grooves formed therein so as to mate with corresponding dove-tail shaped, outwardly projecting ribs on a mounting plate. The interlocking skirt board members have a lower edge that is adapted to cooperate with a moving conveyor belt when the mounting plate is appropriately suspended from a frame system. The narrow rubber blocks comprising the skirt members fail to properly seal in that the blocks tend to fall off their mounts and leakage occurs at the numerous joints. Other patents directed to conveyor belt side curtains include deRooy U.S. Pat. No. 5,303,813, Mott U.S. Pat. No. 5,154,280, Swinderman U.S. Pat. Nos. 5,048,669 and 4,874,082, Gordon U.S. Pat. No. 4,231,471, and Klegg U.S. Pat. No. 3,499,523.

Each of these patents describes side curtains or skirt boards having a stationary mounting plate and a displaceable skirt whose lower edge is brought into contact with a moving conveyor belt to inhibit spillage of granular material off the sides of the conveyor. The need still exists, however, for a less expensive skirt board design that provides ease of mounting relative to a conveyor system and ease of adjustment of the skirt board member at periodic intervals to accommodate wear of the skirt board and an ability to conform to curves in conveyor belts such as commonly occurs at transition areas where the belt leaves a tail pulley and crosses an adjacent troughing roller. The present invention provides such an improvement.

SUMMARY OF THE INVENTION

The present invention comprises a conveyor belt skirt board apparatus that includes a generally rectangular mounting plate of a predetermined thickness and having an upper edge, a lower edge and opposed side edges. The mounting plate is adapted to be suspended from a frame structure that is aligned parallel to side edges of an endless conveyor belt. The mounting plate includes a plurality of regularly spaced, parallel slots of a predetermined width that are formed inward from the lower edge thereof and through its predetermined thickness so as to extend toward, but short of its upper edge. The mounting plate is bent and an angle of about 90° along a line extending between the opposed side edges thereof, the line intersecting at least a portion of each of the parallel slots such that the bent upper portion of the mounting plate includes a plurality of apertures, each contiguous with one of the plurality of parallel slots.

The apparatus further comprises a generally rectangular elastomeric skirt member having first and second major surfaces, a lower edge, an upper edge and opposed side edges. The width of the skirt member spans a plurality of the slots on the mounting plate. The first major surface is generally planar and the second major surface has a plurality of integrally formed, outwardly projecting, compressible, parallel ribs of predetermined thickness and width and the same regular spacing as the regular spacing between the parallel slots formed in the mounting plate. The predetermined thickness of the ribs is less than a corresponding dimension of the aperture in the mounting plate and the width of the ribs is slightly greater than the width of the slots in the mounting plates such that when the ribs are inserted through the apertures and squeezed into the slots in the mounting plate, the skirt member is suspended on the mounting plate with a predetermined friction force.

By serrating the edges of the parallel slots in the mounting plate, upward displacement of the skirt member relative to the mounting plate is inhibited.

DESCRIPTION OF THE DRAWINGS

The foregoing features and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
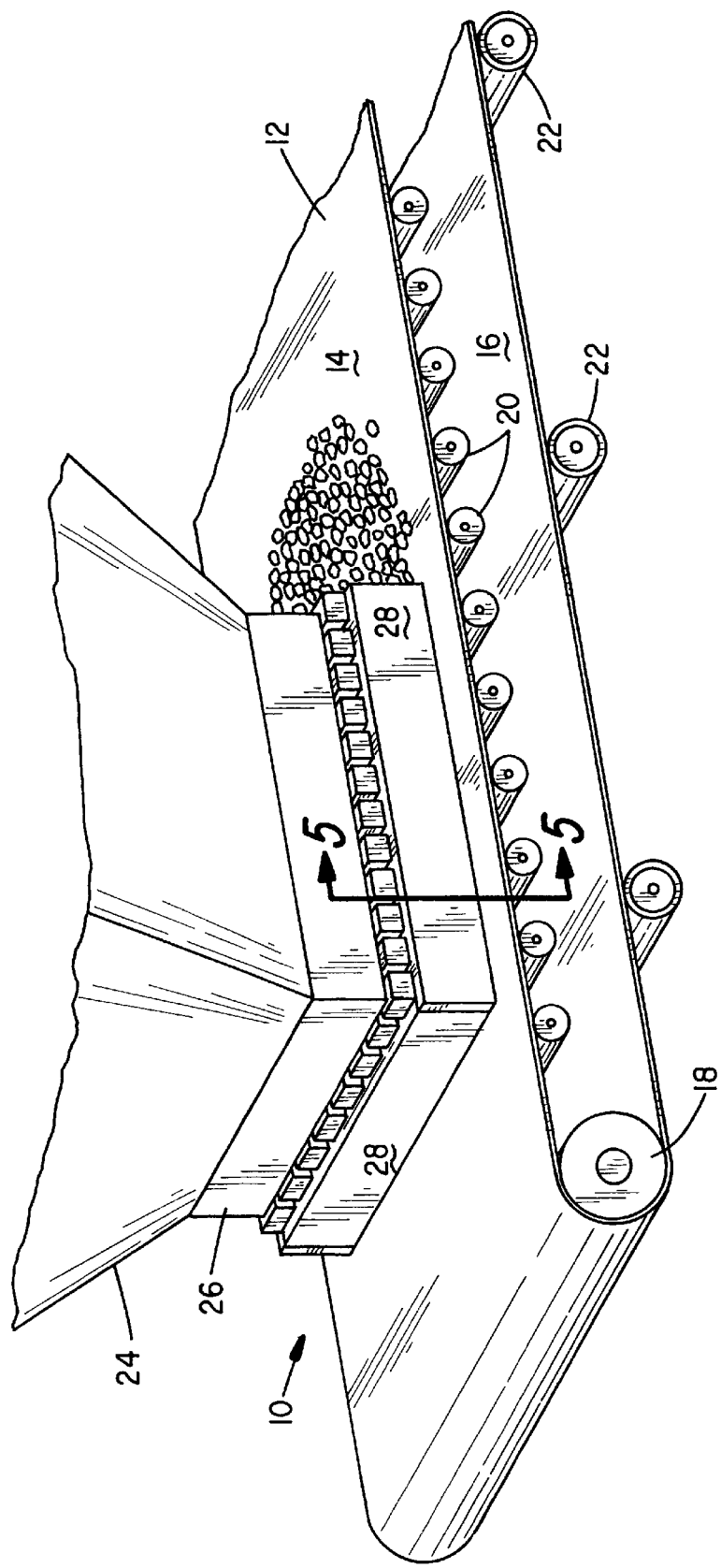
FIG. 1 is a partial perspective view showing conveyor side curtains of the present invention affixed to the mouth of a chute through which granular material is deposited on a moving conveyor belt.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof Said terminology will include the words above specifically mentioned, derivatives thereof and words of similar import.

Referring first to FIG. 1, there is indicated generally by numeral 10 a conveyor system for transporting granular material and incorporating the skirt boards constructed in accordance with the present invention. The conveyor assembly includes an endless belt 12 having an upper flight 14 and a lower flight 16. The belt is deployed about and end roller 18 and another end roller (not shown) with additional spaced rollers 20 supporting the upper flight 14 and rollers 22 supporting the lower flight 16.

Positioned above the upper flight 14 of the conveyor belt 12 is a hopper 24 terminating in a chute 26. Granular material flowing down the hopper 24 and out the chute 26 is intended to land on the upper flight 14 of the conveyor belt. Skirt boards 28 are mounted relative to three sides of the chute 26 to prevent spillage of the granular material off the rear and side edges of the conveyor belt's upper flight 12.

Figure 2:
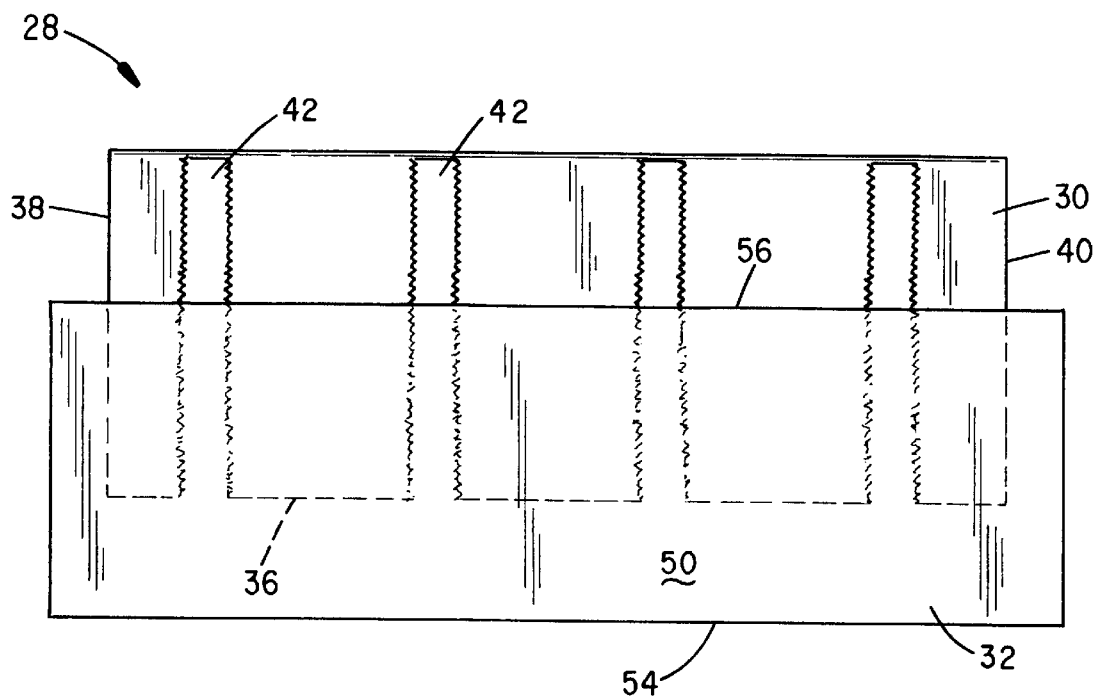
FIG. 2 is a front plan view of a skirt board assembly.
Figure 3:
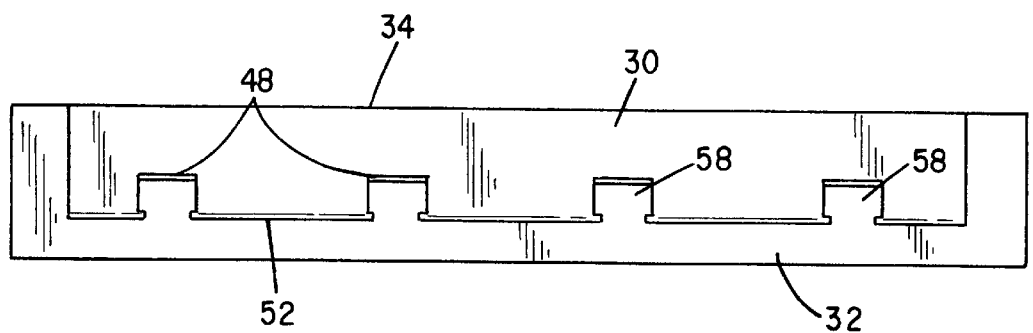
FIG. 3 is a top plan view of FIG. 2.

Referring next to FIGS. 2 and 3, the skirt board assembly 28 is seen to comprise a mounting plate 30 and a molded elastomeric skirt member 32. The mounting plate may be generally rectangular and may have an upper edge 34, a lower edge 36 and opposed side edges 38 and 40. The mounting plate for use in a straight section of the conveyor includes a plurality of regularly spaced, parallel, slots 42 of a predetermined width that are formed inward from the lower edge 36, through the thickness dimension of the plate and that extend toward, but short of, the upper edge 34.

Figure 4:
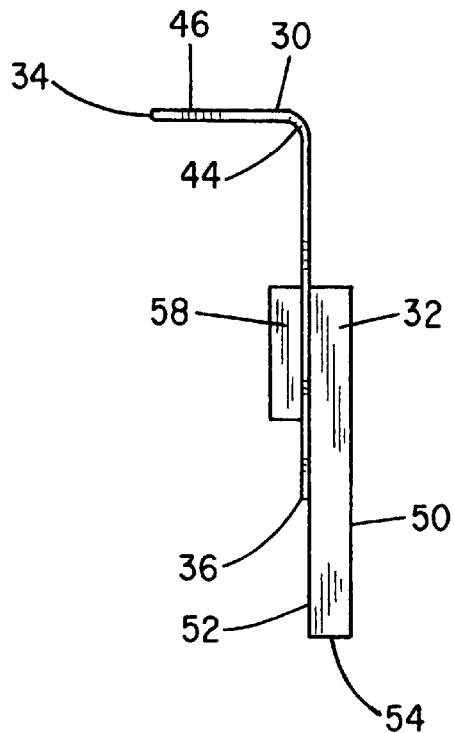
FIG. 4 is a left end view of the skirt board assembly.

As best seen in FIG. 4, the mounting plate 30 is bent at an angle of about 90°, as at 44, along a line extending between the opposed side edges 38 and 40. As best seen in FIGS. 2 and 3, the bend or fold line intersects at least a portion of each of the parallel slots such that the upper bent portion 46 of the mounting plate 30 includes a plurality of apertures, as at 48 in FIG. 3. Each of the apertures is contiguous with one of the plurality of parallel slots 42.

The mounting plate 30 is preferably made from sheet metal in a stamping operation. Stainless steel about ⅛ inch thick is preferred. Following the stamping operation, the sheet is bent in a metal break. As such, the mounting plate can be very economically fabricated. The die used in stamping is constructed so as to provide a serrated edge to the metal defining the parallel slots 42 along the entire length of those slots.

With continued reference to FIGS. 2 and 3, the elastomeric skirt member 32 has an outer major surface 50 and an inner major surface 52 and with a lower edge 54 and an upper edge 56. The first major surface 50 is generally planar while the second major surface has a plurality of integrally formed, outwardly projecting, compressible, parallel ribs 58 of a predetermined thickness and width and with the same regular spacing therebetween as the regular spacing between the parallel slots 42 formed in the mounting plate 30. The thickness dimension of the ribs, i.e., the extent of projection thereof beyond the second major surface 52, is designed to be slightly less than the corresponding dimension of the apertures 48 formed in the mounting plate while the width of the ribs is slightly greater than the width of the slots 42. Hence, when the ribs are inserted through the apertures 48 and guided into the slots, the ribs are squeezed so as to hold or support the skirt member 32 on the mounting plate with a predetermined friction force. The serrations on the edges of the slots 42 are formed so as to inhibit upward movement of the skirt member 32 relative to the mounting plate 40. It is apparent, however, that if a force is applied to the upper edge 56 of the skirt member 32 that is greater than the frictional forces between the ribs 58 and the side edges of the slots 42, the skirt member can be moved downwardly.

The skirt member 32 may be fabricated from polyurethane or other suitable plastic, but a fiber or cord reinforced rubber is perhaps preferred. Its width is such that it will include a plurality of parallel ribs 58 and will span a corresponding plurality of the slots on the mounting plate.

Figure 5:
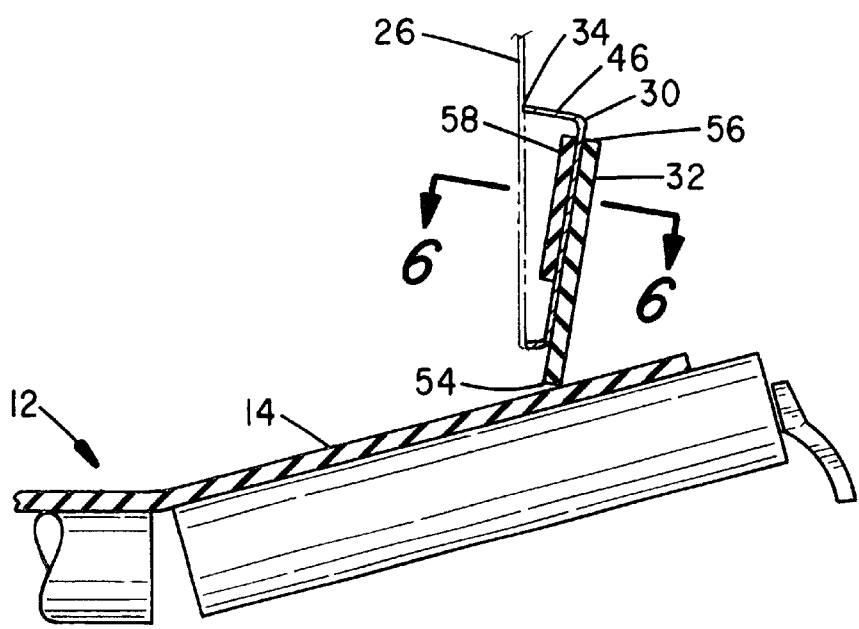
FIG. 5 is a cross-sectional view taken along the line 5—5 in FIG. 1.

Referring next to FIG. 5, the mounting plate 30 is preferably attached to the outer side wall of the chute 26 by welding the two together along the upper edge 34 of the mounting plate and following this attachment, the skirt members 32 may be applied to the mounting plate by guiding the ribs 58 through the apertures 48 and into the parallel, serrated slots 42 of the mounting plate. The skirt member 32 is then forced downward by hammering on the upper edge 56 thereof until the lower edge 54 is made to engage the upper flight 14 of the conveyor 12.

Figure 6:
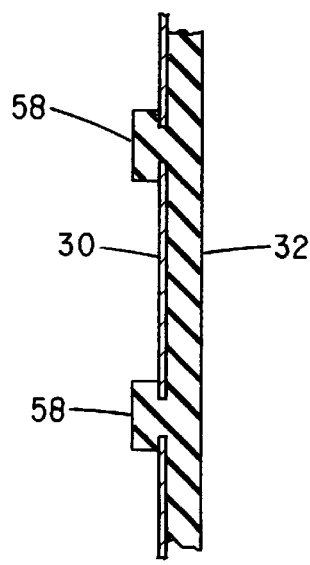
FIG. 6 is a cross-sectional view taken along the line 6—6 in FIG. 5.

The view of FIG. 6 is intended to show the manner in which the resilient, elastomeric ribs 58 become compressed or squeezed between the edges defining the slots 42. The barbs on the serrations are directed such that the sheet 50 can be forced in a downward direction, but effectively precluded from being pushed upward due to possible irregularities in the conveyor belt. Periodically during use, with wearing of the lower edge 54 of the skirt board, it becomes necessary for an operator to hammer down the skirt board to restore a desired degree of contact between the skirt board and the upper flight of the conveyor belt. Ultimately, the worn skirt boards can be removed and replaced with a minimum of down-time. The attachment plate 30 secures the rectangular ribs in a way that prevents the skirt board member 32 from coming loose in the case of belt wander, debris buildup, etc., but can be easily removed for replacement or maintenance by prying loose over end and pulling firmly in a downward and outward direction.

Figure 7:
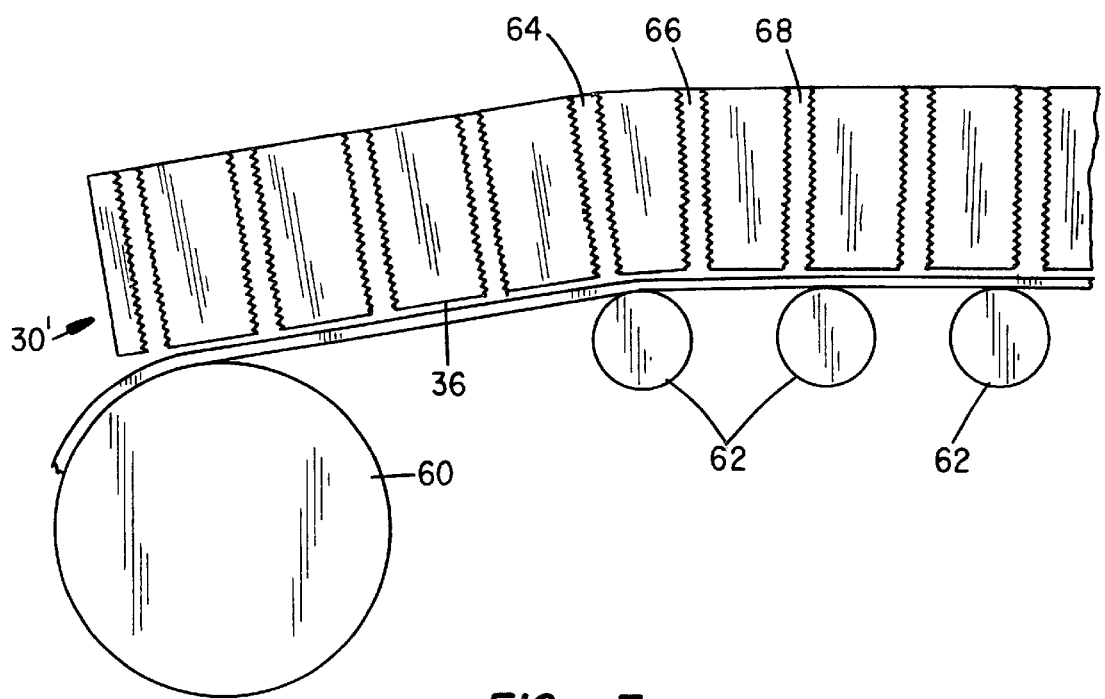
FIG. 7 is a partial side elevation of a skirt board mounting plate adapted to be used proximate a transition zone on a conveyor belt.

In FIG. 7, there is shown a modification of a skirt board mounting plate especially designed to be placed adjacent a transition zone on a conveyor belt flight 12 between a tail pulley 60 to a first of a series of troughing rollers. As is shown at 64, 66 and 68, these slots are not parallel to one another, but instead are spaced further apart at the upper fold line 44 than at the lower edge 36 so that these slots 64, 66, 68 in the transition zone angle slightly toward one another. In this fashion, the lower edge 36 of the mounting plate effectively bends to conform to the belt 36 at the aforementioned transition zone. A single elongated elastomeric skirt member of the type previously described, and having parallel ribs, can be affixed to the mounting plate 30' in FIG. 7 even though slots 64, 66, 68 are slightly angled due to the flexibility of the skirt material which allows it to stretch and compress to fit into the non-parallel slots.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A conveyor belt skirt board apparatus comprising:

(a) a generally rectangular mounting plate of a predetermined thickness and having an upper edge, a lower edge and opposed side edges, the mounting plate adapted to be suspended from a structure aligned parallel to side edges of an endless conveyor belt, said mounting plate including a plurality of regularly spaced slots of a predetermined width formed inward from a location proximate the lower edge thereof and completely through the predetermined thickness thereof and extending toward, but short of the upper edge, the plate including a flange portion projecting at a predetermined angle along a line extending between the opposed side edges, the line intersecting at least a portion of each of the slots such that the flange portion of the mounting plate includes a plurality of apertures each contiguous with one of the plurality of slots;

(b) a generally rectangular, elongated, elastomeric skirt member having first and second major surfaces, a lower edge, an upper edge and opposed side edges, the first major surface being generally planar and the second major surface having a plurality of integrally formed, outwardly projecting, compressible, parallel ribs of predetermined thickness and width and generally the same regular spacing as the regular spacing between the slots formed in the mounting plate, the predetermined thickness of ribs being less than a corresponding dimension of said apertures and the width of the slightly greater than the width of said slots such that when the ribs are inserted through the apertures and squeezed into the slots in the mounting plate, the skirt member is suspended on the mounting plate with a predetermined friction force.

2. The conveyor belt skirt board apparatus of claim 1 wherein the skirt member is a cord reinforced rubber sheet.

3. The conveyor belt skirt assembly of claim 1 wherein the mounting plate is stainless steel.

4. The conveyor belt skirt assembly of claim 1 wherein the predetermined angle is about 90°.

5. The conveyor belt skirt board apparatus as in claim 1 wherein the apertures in the flange are of a greater width dimension than the predetermined width of the slots with which said apertures are contiguous.

6. The conveyor belt skirt board apparatus of claim 1 wherein the edges defining said slots in the mounting plate are serrated to resist upward displacement member relative to the mounting plate.

7. The conveyor belt skirt board apparatus of claim 6 wherein the skirt member is downwardly adjustable upon application of a force on the upper edge of the skirt member exceeding the predetermined friction force to position the lower edge of the skirt member against a conveyor belt.

8. The conveyor belt skirt assembly of claim 1 wherein the regularly spaced slots are parallel over a predetermined width dimension of the mounting plate.

9. The conveyor belt skirt assembly of claim 6 wherein selected ones of the regularly spaced slots are non-parallel in a second predetermined width dimension of the mounting plate.

* * * * *

UNITED STATES PATENT AND TRADEMARK OFFICE
CERTIFICATE OF CORRECTION

PATENT NO. : 6,328,156 B1
DATED : December 11, 2001
INVENTOR(S) : Arthur C. Ostman It is certified that error appears in the above-identified patent and that said Letters Patent is hereby corrected as shown below:

Column 5,
Line 23, before "slightly" insert -- ribs being --.

Column 6,
Line 12, after "displacement" insert -- of the skirt --.

Signed and Sealed this

Thirtieth Day of July, 2002

*Attest:*

*Attesting Officer*

JAMES E. ROGAN
*Director of the United States Patent and Trademark Office*